United States Patent

[11] 3,627,003

| [72] | Inventors | Kenneth Quentin Kessler<br>Bettendorf, Iowa;<br>Earl Crittion Davis, Jr., Moline, Ill. |
|---|---|---|
| [21] | Appl. No. | 738,590 |
| [22] | Filed | June 20, 1968 |
| [45] | Patented | Dec. 14, 1971 |
| [73] | Assignee | Deere & Company<br>Moline, Ill. |

[54] TREE SHEAR
6 Claims, 5 Drawing Figs.

[52] U.S. Cl..................................................... 144/34 E, 144/3 D
[51] Int. Cl...................................................... A01g 23/02
[50] Field of Search........................................ 83/600; 144/2 Z, 3 D, 34 R, 34 E, 309 AC; 214/147 G, 652

[56] References Cited
UNITED STATES PATENTS
2,604,220 7/1952 Frischmann................... 214/652
FOREIGN PATENTS
120,237 5/1901 Germany...................... 83/600
OTHER REFERENCES
Publication: Forest Industries Magazine; September 1967; page 66

*Primary Examiner*—Gerald A. Dost
*Attorneys*—H. Vincent Harsha, Harold M. Knoth, William A. Murray and John M. Nolan ABSTRACT: A tree-shearing device that includes a horizontal frame, a pair of levers supported to swing horizontally on the frame toward and away from one another, a pair of blades supported to swing horizontally on the respective levers, and cam means on the main frame that engage the blades that cause the blades to shift in a desired pattern in response to the levers swinging horizontally.

Patented Dec. 14, 1971

INVENTORS
KENNETH Q. KESSLER &
EARL C. DAVIS, JR.

BY William A. Murray

ATTORNEY

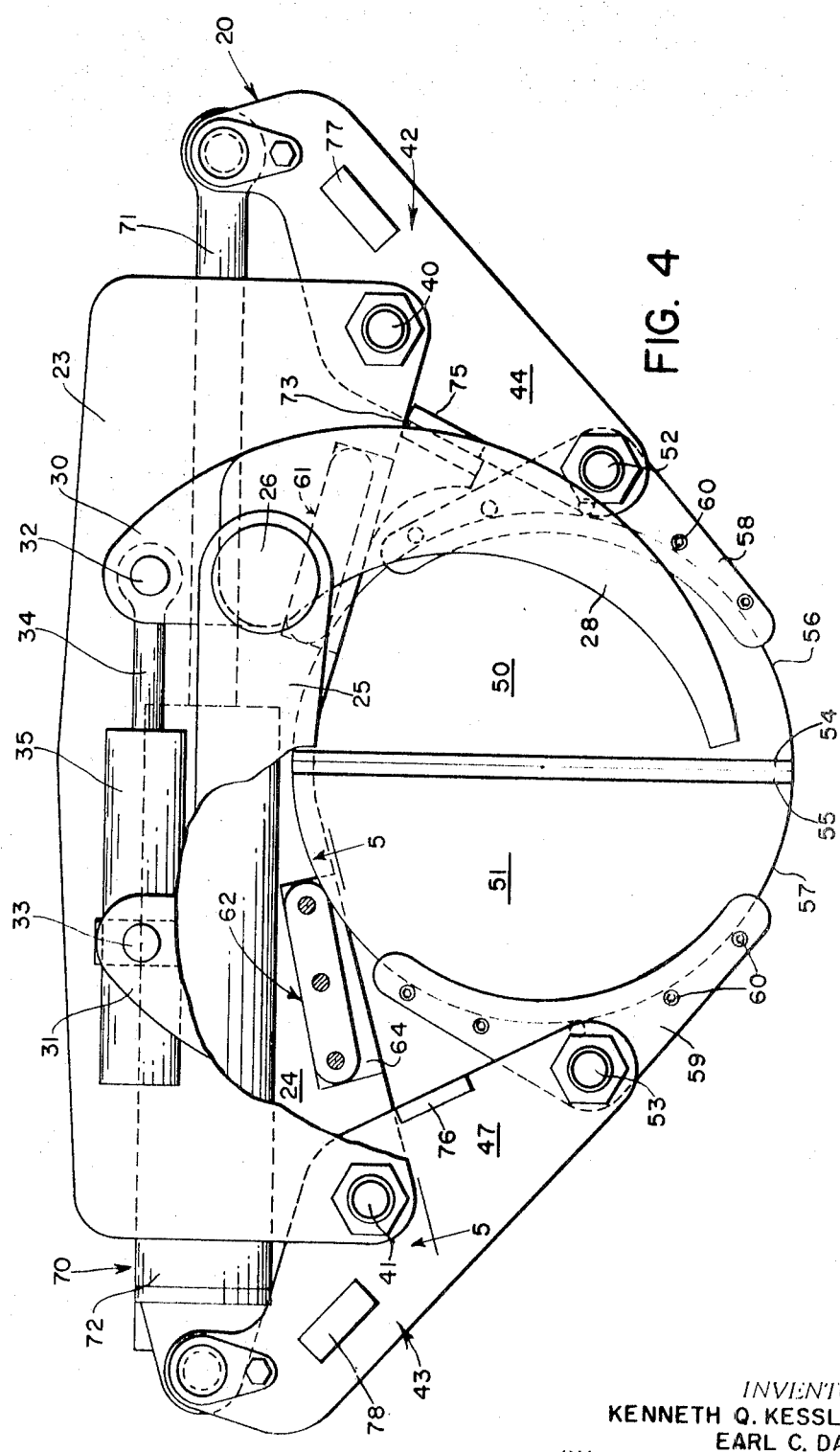

3,627,003

TREE SHEAR

BACKGROUND OF THE INVENTION

This invention relates to a tree shear and more particularly to a tree shear that utilizes a pair of blades that swing in a substantially horizontal plane toward and away from one another and are guided in their movement by cams that engage the edges of the blades to cause them to shift in a preferred pattern as they open and close in respect to one another.

It has heretofore been known to provide a pair of shearing blades that are carried on a transverse frame. The blades are normally operated to open and close relative to one another by hydraulic cylinders extending between the frames and the blades. In some instances there have been used linkages extending between the blades and cylinders for creating a desired pattern of movement of the blades.

The problem with having a direct connection between the cylinders and blades is that there is only a single motion to the blades that is created as the blades close and again as the blades open. The problem of having linkage connections between the cylinders and the blades is that every linkage connection must have at least two pivots. There is limited space that the linkage connections may be placed and since the shear device is contemplated to cut a relatively large tree, these linkage connections must be capable of withstanding extremely large loads. Therefore, there is the possibility of early failure when using linkages. On one hand, therefore, the very simplest connections do not give sufficient movement of the blades and the more complicated linkage connections which would give the desired pattern of movement of the blades are relatively fragile in relation to the work desired to be performed.

SUMMARY OF THE INVENTION

With the above in mind it is the primary object of the present invention to use a very simple blade-mounting structure in a tree shear and which provides for a pattern of movement of the shearing blades that is created by the blades contacting cam surfaces. Consequently there are only the very simplest of connections between the blades and the frame while at the same time the pattern of movement of the blades as they open and close is comparatively complicated.

More specifically it is the object of the invention to provide a pair of levers that swing on the shear frame about vertical axes and toward and away from one another. The levers are controlled in their movement by a single hydraulic cylinder that extends between and has its cylinder end connected to one lever and its ram end connected to the other lever. The forward ends of the levers carry blades which are adapted to swing about vertical axes. The rear edges of the respective blades bear against cam surfaces on the supporting frame that shift the blades about their vertical axes in response to the levers shifting about their vertical axes. Thus, as the blades are opened, they will diverge only slightly from their forward ends and as they are closed, they will have their cutting edges abut one another.

As a further object of the invention it is proposed to have the respective blades be semicircular with the cutting edges along the diameter of the blades. By so constructing and shaping the blades, they may be reversible.

BRIEF DESCRIPTION OF THE DRAWINGS

FIG. 4 is a plan view of the device, with portions thereof being shown in section and as taken substantially along the line 4—4 of FIG. 3.

DESCRIPTION OF THE PREFERRED EMBODIMENT

Figure 1:
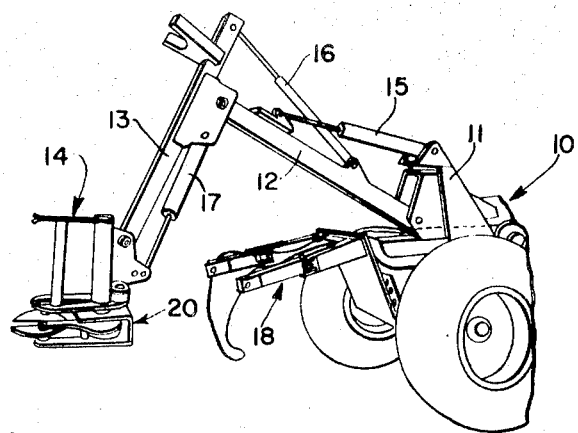
FIG. 1 is a rear and side perspective view of a tractor-mounted tree-shearing device.

The tree-shearing device is of the type supported on a main mobile frame such as a tractor 10. An implement-supporting post structure 11 is carried on the tractor and supports a boom 12 which in turn has a second boom 13 carried at its outer end. The tree-shearing device, indicated in its entirety by the reference numeral 14, is carried on the outermost end of the boom 13. Hydraulic cylinders 15, 16 and 17 are provided for adjusting the first boom 12, the second boom 13 and the shearing device 14. A cable-type accumulator or buncher, indicated in its entirety by the reference numeral 18, is provided on the end of the tractor beneath the boom 12.

Figure 2:
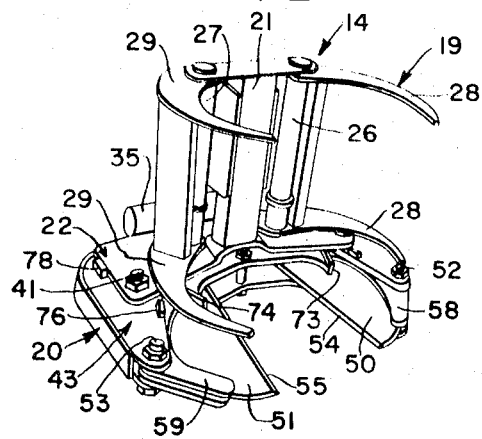
FIG. 2 is a rear and slightly overhead perspective view of the shearing device in its open position.
Figure 3:
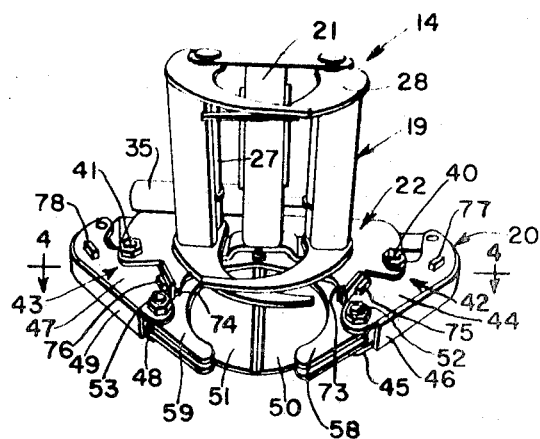
FIG. 3 is a rear and slightly overhead perspective view of the shearing device in its closed position.
Figure 5:
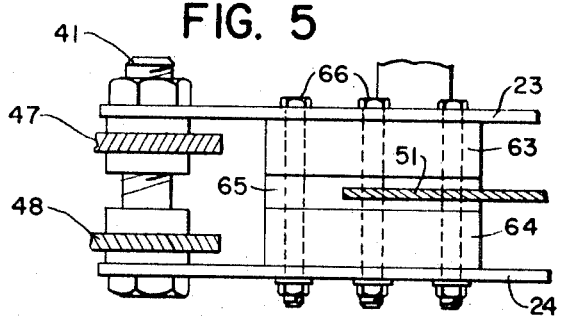
FIG. 5 is a sectional view taken substantially along the line 5—5 of FIG. 4.

The shearing device 14 is composed of an upper tree-gripping portion 19 and a lower tree-shearing portion 20. The shearing device has a main frame structure that includes a central upright post 21 and a horizontal structure 22 that extends transversely to opposite sides of the lower end of the post 21. The horizontal portion 22 is composed of upper and lower horizontal plates 23, 24 respectively. The post 21 carries a transverse horizontal plate 25 at its upper end. The plate 25 is welded to the post 21. The outer ends of the plate 25 have vertical openings for receiving upper ends of vertical support rods 26, 27. The lower ends of the rods 26, 27 are supported on the upper plate 23. Forwardly directed claw arms 28, 29 project forwardly from the rods 26, 27. The arms 28, 29 each have upper and lower arcuate-shaped arms that may be utilized to grip opposite sides of a tree. The arms 28, 29 have rearward extensions 30, 31 with vertical pivot means 32, 33. The pivot 32 receives the rod end 34 of a hydraulic motor and the pivot 33 is fixed to the cylinder end 35 of the motor. Consequently as the hydraulic rod 34 is extended the gripping arms 28, 29 will close and as they are retracted the same arms will open. FIG. 2 shows the arms 28, 29 in their open position and FIG. 3 shows them in their closed position. The upper and lower plates 23, 24 support at their outer forward ends a pair of upright or vertical pivot pins 40, 41 on which are supported levers 42, 43. The levers 42, 43 are of the three-point type having their intermediate portions supported on the vertical pins 40, 41 so that the entire levers swing horizontally. The levers 42, 43 are of channel construction with the left-hand lever 42 having upper and lower horizontal structural plates 44, 45 and with a vertical flange 46 connecting their outermost edges, and the right-hand lever 43 having upper and lower horizontal plates 47, 48 with their outermost edges being connected by a vertical flange 49. The forward ends of the respective levers 42, 43 support a pair of horizontal blades 50, 51 on vertical upright pivot pins 52, 53 that extend between the plates 44, 45 and 47, 48 respectively. The blades 50, 51 are semicircular with inner diametrically extending and opposed cutting edges 54, 55 and arcuate or semicircular outer edges 56, 57 respectively. The blades 50, 51 are carried on the respective vertical pivots 52, 53 by mounting brackets 58, 59 that have horizontal and arcuate-shaped flanges disposed above and below the edges 56, 57 with recessed setscrews 60 extending through the respective brackets and plates 50, 51. The brackets 58, 59 are provided with vertical hubs that fit about the respective pins 52, 53.

Positioned inwardly and slightly rearwardly of the respective pivot pins 40, 41 are cam structures 61, 62 which are identical to one another. The cam structure 62 is composed of upper and lower horizontal spacers 63, 64 respectively that sandwich therebetween a hardened elongated guide means or cam 65. Bolts 66 extend through the upper and lower plates 23, 24, through the spacers 63, 64 and the cam 65. It will be noted from viewing FIG. 4 the hardened cam element 65 is recessed rearwardly from the front edges of the spacers 63, 64 that receive the rear parts of the respective outer edges 56, 57. It will be noted that the edges of the blades 50, 51 are in contact with the cams 65 of the respective cam structures 61, 62. Reviewing FIGS. 2–4, it is clearly apparent that as the levers 42, 43 swing outwardly from a position in which the blade edges 54, 55 abut, the edges of the cams 65 will remain in contact with the outermost edges 56, 57 of the blades and will cause the blades to follow a preferred pattern of movement about the pivots 52, 53. Specifically it is desired to retain substantially the full length of the edges 54, 55 in transversely spaced relation to one another and to diverge them only slightly when the levers 42, 43 move to their outermost positions. Thus, the cams 65 operate to properly position the blades 50, 51 in open and shut positions in direct response to shifting of the respective levers 42, 43.

A hydraulic motor 70 extends between the rear ends of the levers 42, 43. The motor 70 includes a ram 71 that is connected to the left-hand lever 42 and a cylinder 72 that is connected to the right-hand lever 43. The motor 70 is generally disposed between the upper and lower plates 23, 24 and may be classified as a floating-type motor inasmuch as there is no part thereof that is fixed against motion or action. As is clearly obvious from viewing FIG. 4, as the motor 70 extends, the forward ends of the levers 42, 43 swing inwardly and conversely as the motor 70 retracts the forward ends swing outwardly. Also, if one of the blades 50, 51 resists movement more than the other, the entire load of the motor 70 will be shifted to move the lever that has the least resistance. For this reason, the plate 23 is provided with upright abutments 73, 74 that are positioned to engage abutments 75, 76 at the innermost edges of the levers 42, 43 and to limit their movement to a position in which the blade cutting edges 54, 55 abut. Likewise, the upper plates 44, 47 have upwardly projecting abutments 77, 78 that are positioned to engage the fore-and-aft edges at opposite ends of the plate 23. The abutments 77, 78 will engage the edges upon the arms moving to what may be considered their outermost positions. Therefore, it is possible that one lever 42, 43 may be moved between its innermost and outermost positions before the opposite lever begins movement. This will, of course, be on rare occasions but the device is designed to so operate.

We claim:

1. A shearing device composed of a main transverse frame structure with opposite transversely spaced ends; a pair of levers supported on opposite ends of the frame structure to swing horizontally about vertical axes toward and away from one another, each of the levers having forward ends forwardly of the structure; a pair of horizontal blades forwardly of the structure and having opposed and fore-and-aft extending inner cutting edges and rear arcuate shaped edge means; vertical pivot means supporting the respective blades on the forward ends of the respective levers; cam guide means on the frame structure engageable with the rear edge means of the respective blades adapted to angularly adjust the blades on their respective vertical pivot means in response to their being shifted laterally by the respective levers; and hydraulic motor means for adjusting the levers laterally about their pivots.

2. The structure as set forth in claim 1 in which the cam guide means are cams with forwardly facing edges that engage the rear edge means on the respective blades and are so positioned and shaped that as the levers shift the blades outwardly in respect to one another, the blade cutting edges will diverge rearwardly in respect to one another.

3. The structure as set forth in claim 2 in which the blades are coplanar and the cutting edges will be forced by the cams to substantial abutment upon the levers shifting them to their innermost positions.

4. The structure as set forth in claim 1 in which the hydraulic motor means is an extensible and retractable hydraulic cylinder and ram device with the hydraulic cylinder being connected to one lever and the ram being connected to the other end and further characterized by abutment means on the structure engageable with the respective levers for limiting inward shifting of the levers and blades to respective positions in which the cutting edges substantially abut and are in fore-and-aft disposition.

5. The structure as set forth in claim 1 in which the levers are three-point levers, the hydraulic motor means is an extensible and retractable ram and cylinder, the levers swing about points intermediate their ends on the respective ends of the structure; the aforesaid vertical pivot means are on the forward ends of the levers, and the rear ends of the levers are connected to the ram and cylinder respectively.

6. The structure as set forth in claim 1 in which each blade is one-half of a circular plate with each of the respective cutting edges being along the diameter.